(12) United States Patent
Bekmambetov

(10) Patent No.: US 10,965,629 B1
(45) Date of Patent: Mar. 30, 2021

(54) METHOD FOR GENERATING IMITATED MOBILE MESSAGES ON A CHAT WRITER SERVER

(71) Applicant: SCREENSHARE TECHNOLOGY LTD., Nicosia (CY)

(72) Inventor: Timur Bekmambetov, Moscow (RU)

(73) Assignee: Screenshare Technology Ltd., Nicosia (CY)

(*) Notice: Subject to any disclaimer, the term of this patent is extended or adjusted under 35 U.S.C. 154(b) by 670 days.

(21) Appl. No.: 15/599,324

(22) Filed: May 18, 2017

Related U.S. Application Data

(60) Provisional application No. 62/344,895, filed on Jun. 2, 2016.

(51) Int. Cl.
| | |
|---|---|
| *H04L 12/58* | (2006.01) |
| *G06T 13/80* | (2011.01) |
| *G06F 40/154* | (2020.01) |
| *G06F 40/166* | (2020.01) |
| *G06F 3/0488* | (2013.01) |
| *G06F 3/0484* | (2013.01) |

(52) U.S. Cl.
CPC .......... *H04L 51/10* (2013.01); *G06F 40/154* (2020.01); *G06F 40/166* (2020.01); *G06T 13/80* (2013.01); *H04L 51/04* (2013.01); *G06F 3/04847* (2013.01); *G06F 3/04883* (2013.01)

(58) Field of Classification Search
CPC ..... G06Q 10/107; H04L 12/585; H04L 12/58; H04L 12/581; H04L 12/5855; H04L 51/10; H04L 51/04; G06F 40/154; G06F 40/166; G06F 3/04883; G06F 3/0487; G06F 3/0488; G06F 3/0484; G05T 13/80; G06T 13/80

USPC .............. 709/206, 204; 379/93.01; 370/260; 715/759; 707/770
See application file for complete search history.

(56) References Cited

U.S. PATENT DOCUMENTS

| | | | |
|---|---|---|---|
| 9,866,795 B2* | 1/2018 | Caldwell ................. G06T 13/40 |
| 10,003,964 B1* | 6/2018 | Blintsov ............... H04W 12/02 |
| 10,289,302 B1* | 5/2019 | Marsden ................ G06F 3/041 |
| 2006/0041848 A1* | 2/2006 | Lira ...................... G06Q 10/107 |
| | | | 715/805 |
| 2006/0129933 A1* | 6/2006 | Land ........................ G09G 5/00 |
| | | | 715/723 |
| 2009/0128567 A1* | 5/2009 | Shuster ................... G06T 13/40 |
| | | | 345/473 |
| 2010/0081116 A1* | 4/2010 | Barasch ............. A63B 24/0003 |
| | | | 434/252 |
| 2013/0174052 A1* | 7/2013 | Blattner ................. H04L 51/04 |
| | | | 715/752 |
| 2014/0040810 A1* | 2/2014 | Haliburton .......... G06F 3/04886 |
| | | | 715/773 |

(Continued)

*Primary Examiner* — Minh Chau Nguyen
*Assistant Examiner* — Mehulkumar J Shah
(74) *Attorney, Agent, or Firm* — Bardmesser Law Group

(57) ABSTRACT

A method for an automated chatwriter implemented on a chatwriter server is provided. A chatwriter application is provided to create an imitation of a real device chat displaying personal's emotions during the chatting process in an instant messaging software modules. The chatwriter can be used in a movie industry to simplify the process of chatting between users and to maintain a "real-life" chat effect. It can be used as a story telling tool that can generate a content in order to fulfill social needs of the users. The chat content can be created in advance and the selected chat can be displayed at any time.

18 Claims, 13 Drawing Sheets

(56) References Cited

U.S. PATENT DOCUMENTS

| | | | |
|---|---|---|---|
| 2015/0346916 A1* | 12/2015 | Jisrawi | H04L 51/14 |
| | | | 715/752 |
| 2016/0005050 A1* | 1/2016 | Teman | G06Q 30/018 |
| | | | 705/317 |
| 2016/0344668 A1* | 11/2016 | Young | H04W 4/12 |
| 2017/0237692 A1* | 8/2017 | Sheth | H04L 51/02 |
| | | | 715/758 |
| 2017/0336960 A1* | 11/2017 | Chaudhri | H04L 51/16 |
| 2018/0032997 A1* | 2/2018 | Gordon | G06Q 30/0269 |

* cited by examiner

Conventional Art

Conventional Art

Conventional Art

Conventional Art

US 10,965,629 B1

METHOD FOR GENERATING IMITATED MOBILE MESSAGES ON A CHAT WRITER SERVER

CROSS-REFERENCE TO RELATED APPLICATIONS

This application is a non-provisional of US Provisional Patent Application No. 62344895, filed on Jun. 2, 2016.

BACKGROUND OF THE INVENTION

Field of the Invention

This invention relates to a method for simulation of exchanging information between computing devices and, in particular, to creating a chat animation on a chat server that imitates actual chat exchanges between any computing device users.

Description of the Related Art

Most of the modern computing devices are configured to type, send and receive messages. There are many contexts where it is necessary to fake chat-type exchanges. For example, in movies, characters exchange messages (which are shown to the viewer). In practice, to film this, such messages have to be sent using real phones, which is often inconvenient for filming purposes.

Additionally, several mobile applications allow for creation of fake messages. For example, FIG. 1 illustrates creating a fake iPhone text message. The message can be created, downloaded and shared with others. This can be used for text message pranks, jokes, chats, etc.

FIG. 2 illustrates an iPhone Text Generator. This is a tool that allows a user to create a realistic text or an iMessage screenshot of a fake custom conversation. This system uses static images generated on the website.

Figure 1:

However, none of the existing fake chat creation solutions provide for the animation of a real-time typing of a messaging chat between a sender and a receiver. The existing services only allow for creating screen shots of the user chats occurring on electronic devices.

Accordingly, a realistic animation displaying a process of a messenger (mobile or desktop) chat text typing and receiving is desired.

SUMMARY OF THE INVENTION

This invention relates to a method for imitation of exchanging information between electronic computing devices, and, in particular, to creation of chat animation that imitates actual chats on computing devices that substantially obviates one or more of the disadvantages of the related art.

In one aspect, a method for an automated chatwriter implemented on a chat server is provided. According to an exemplary embodiment, a server-based chatwriter application is provided to create an imitation of a real chat displaying a person's emotions during the chatting process. The proposed chatwriter can be used in the film industry to simplify the process of imitating chatting between users and to maintain a "real-life" chat effect. The chat content can be created in advance, and the selected chat can be displayed at any time. This, advantageously, saves time during filmmaking.

Another objective is to generate interesting content to fulfill social needs for mobile and desktop users.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 2:
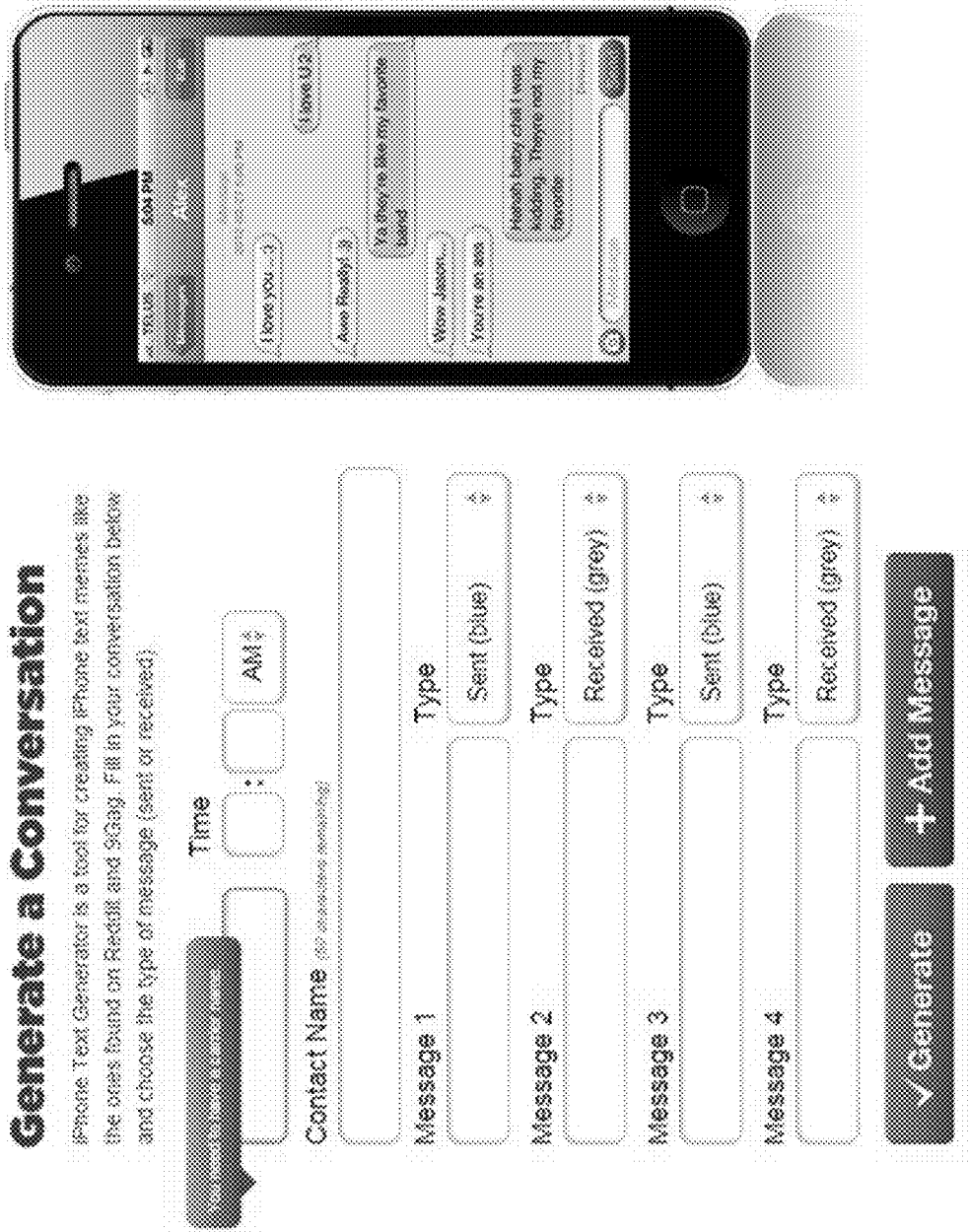
Figure 3:
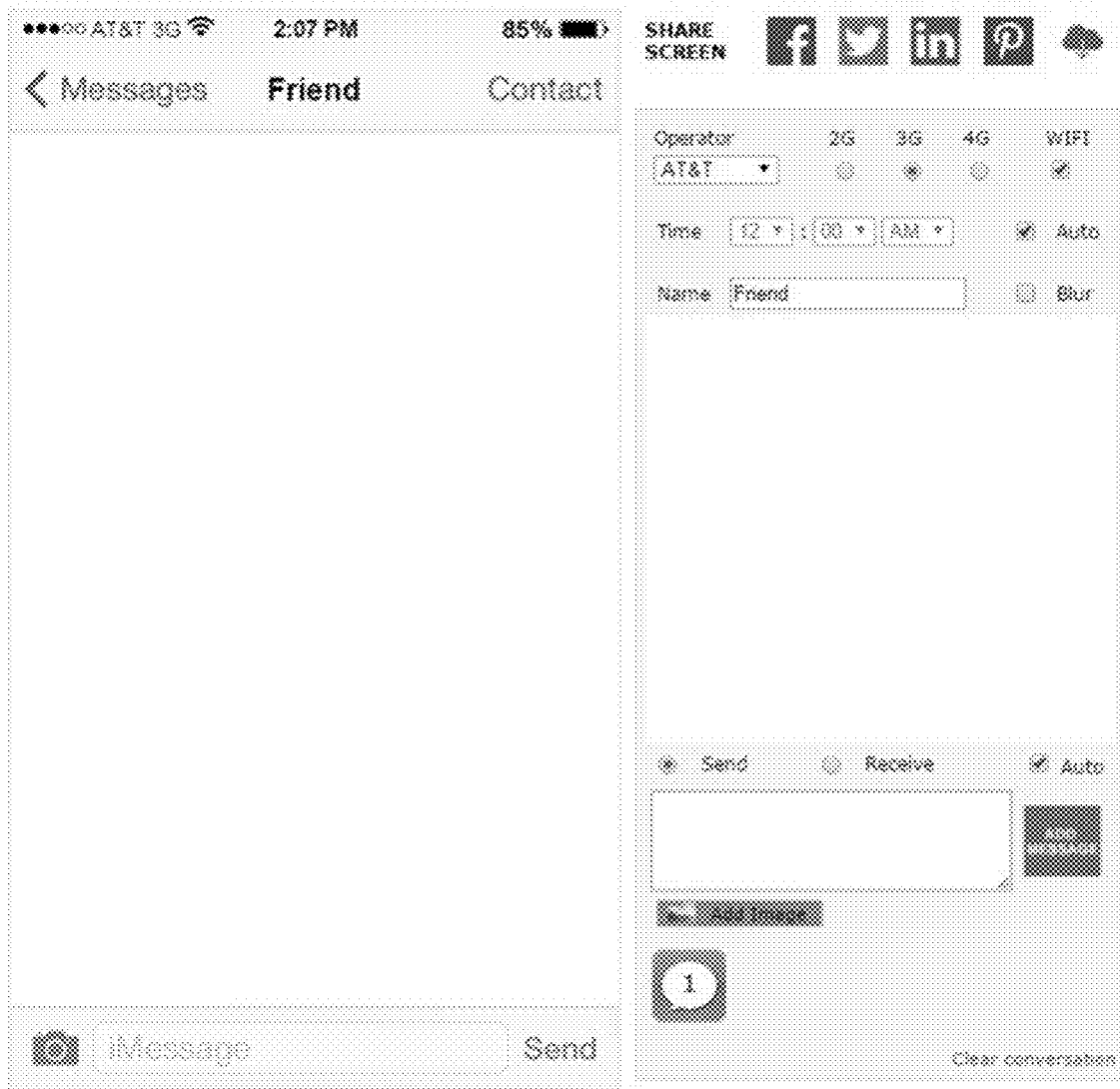
FIG. 3 illustrates creating and sharing iPhone text conversations with images.
Figure 4:
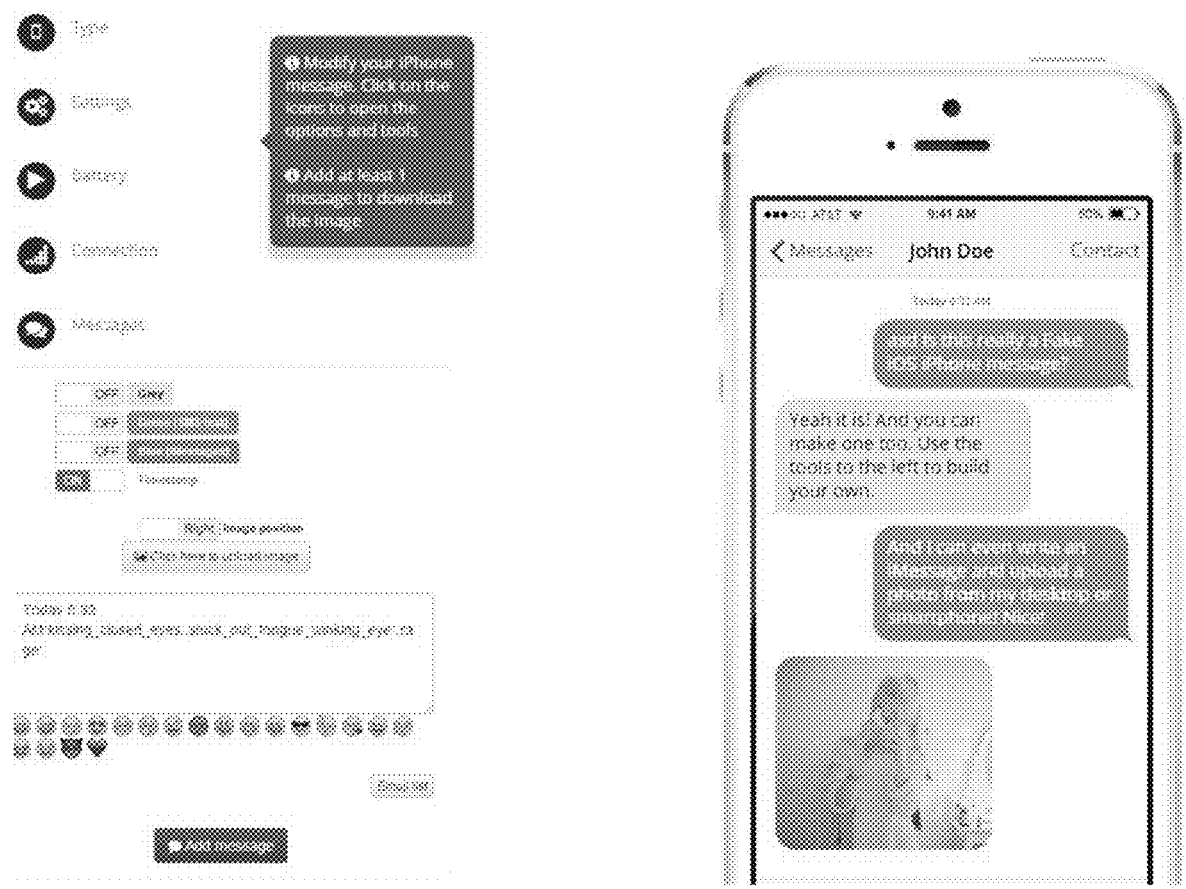
FIG. 4 illustrates a first iOS text message generator. Even though the iOS has been updated, people still seem to post these fake old iPhone messages everywhere.
Figure 5:
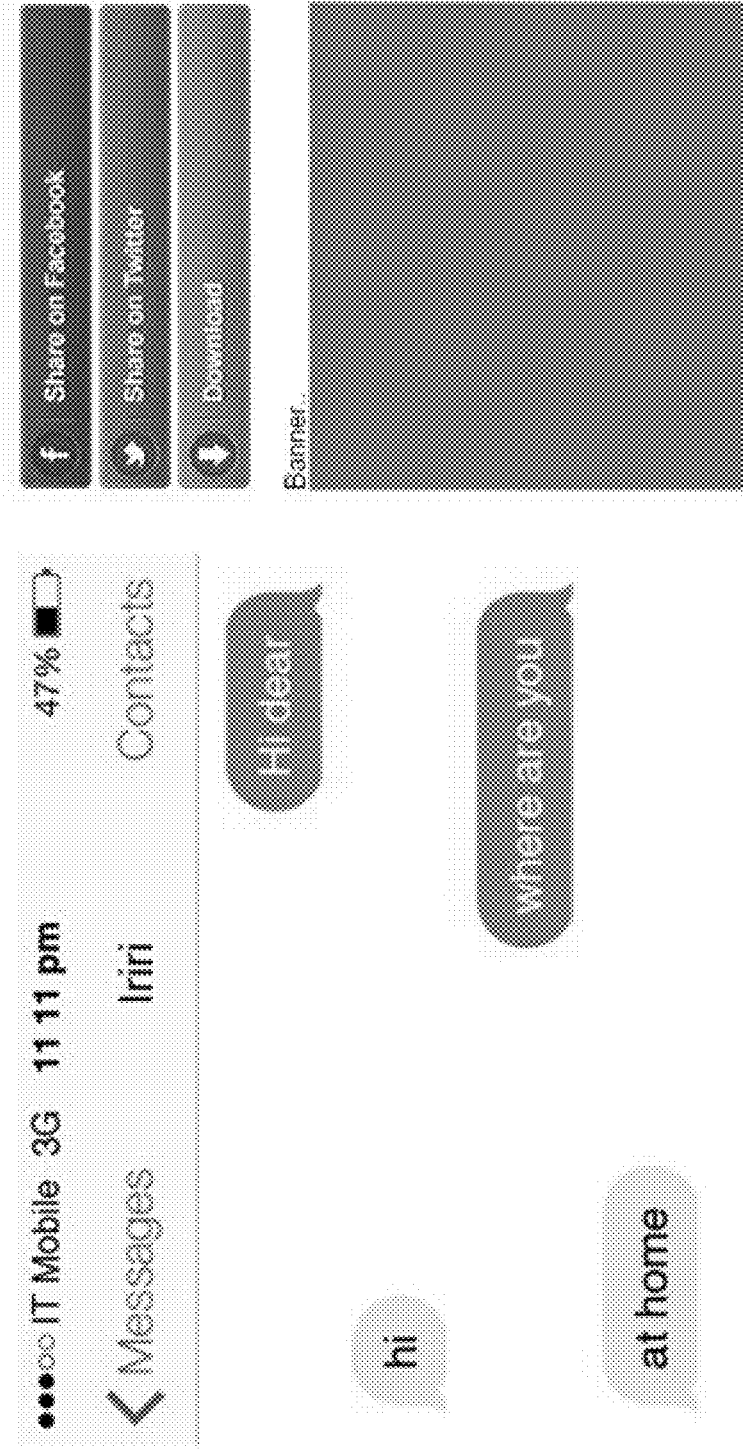
FIG. 5 illustrates how to generate an iPhone text conversation. The iPhone Text Generator is a tool for creating iPhone text memes like the ones found on Reddit and 9Gag.
Figure 6:
FIG. 6 illustrates WhatsFake made so one can simulate real conversations. The user snapshot appears the same as if it was made on Whatsapp.

In the drawings:

FIG. 1 illustrates a conventional method for creating a fake iPhone text message;

FIG. 2 illustrates a conventional iPhone Text Generator;

FIG. 3 illustrates a conventional system for creating and sharing iPhone text conversations with images;

FIG. 4 illustrates a conventional first iOS text message generator;

FIG. 5 illustrates a conventional approach to generate an iPhone text conversation;

FIG. 6 illustrates WhatsFake made so one can simulate a real conversation.

Figure 7:
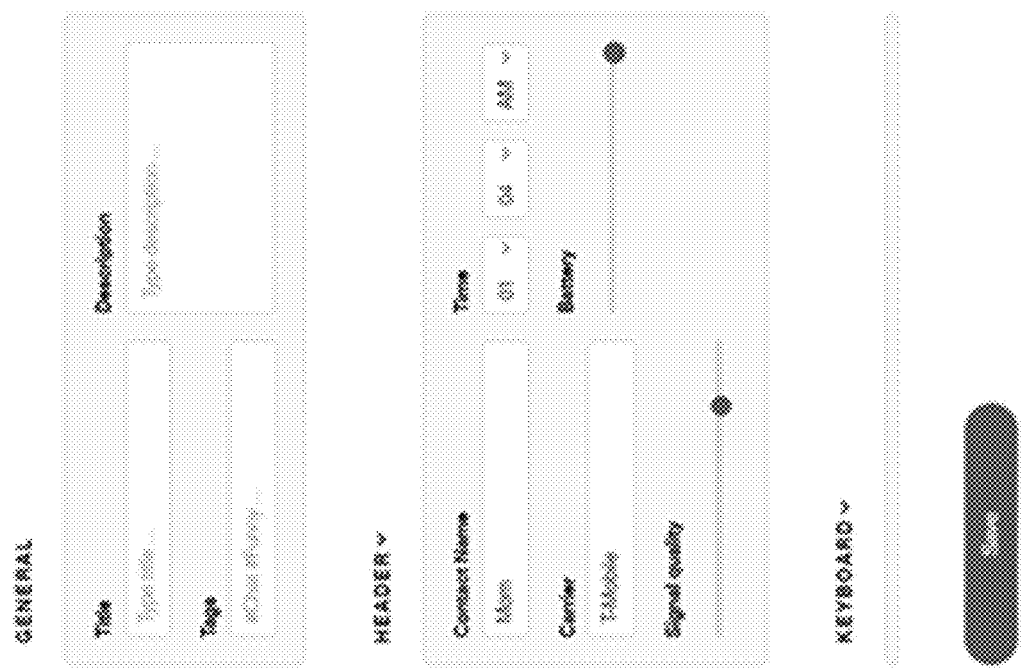
Figure 7:
Figure 8:
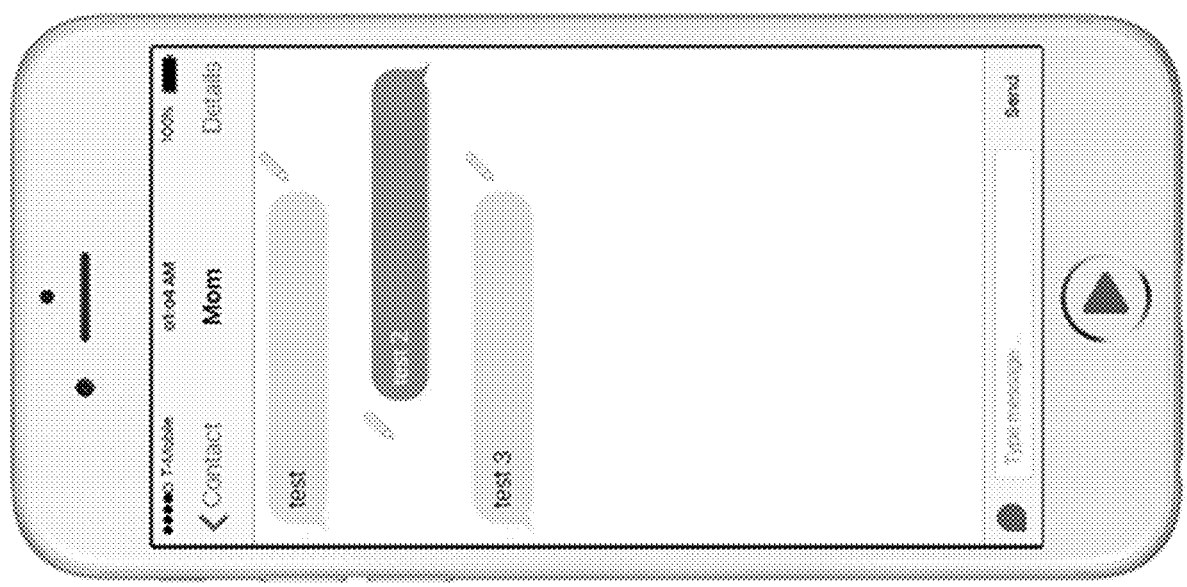
Figure 8:
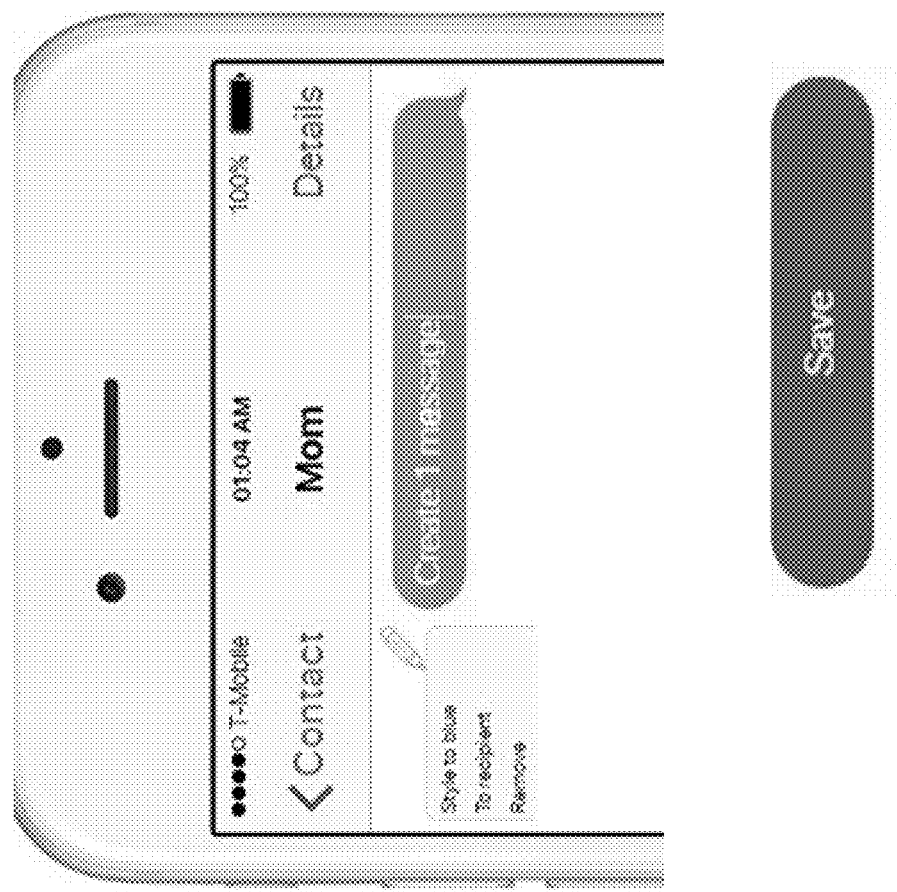
Figure 9:
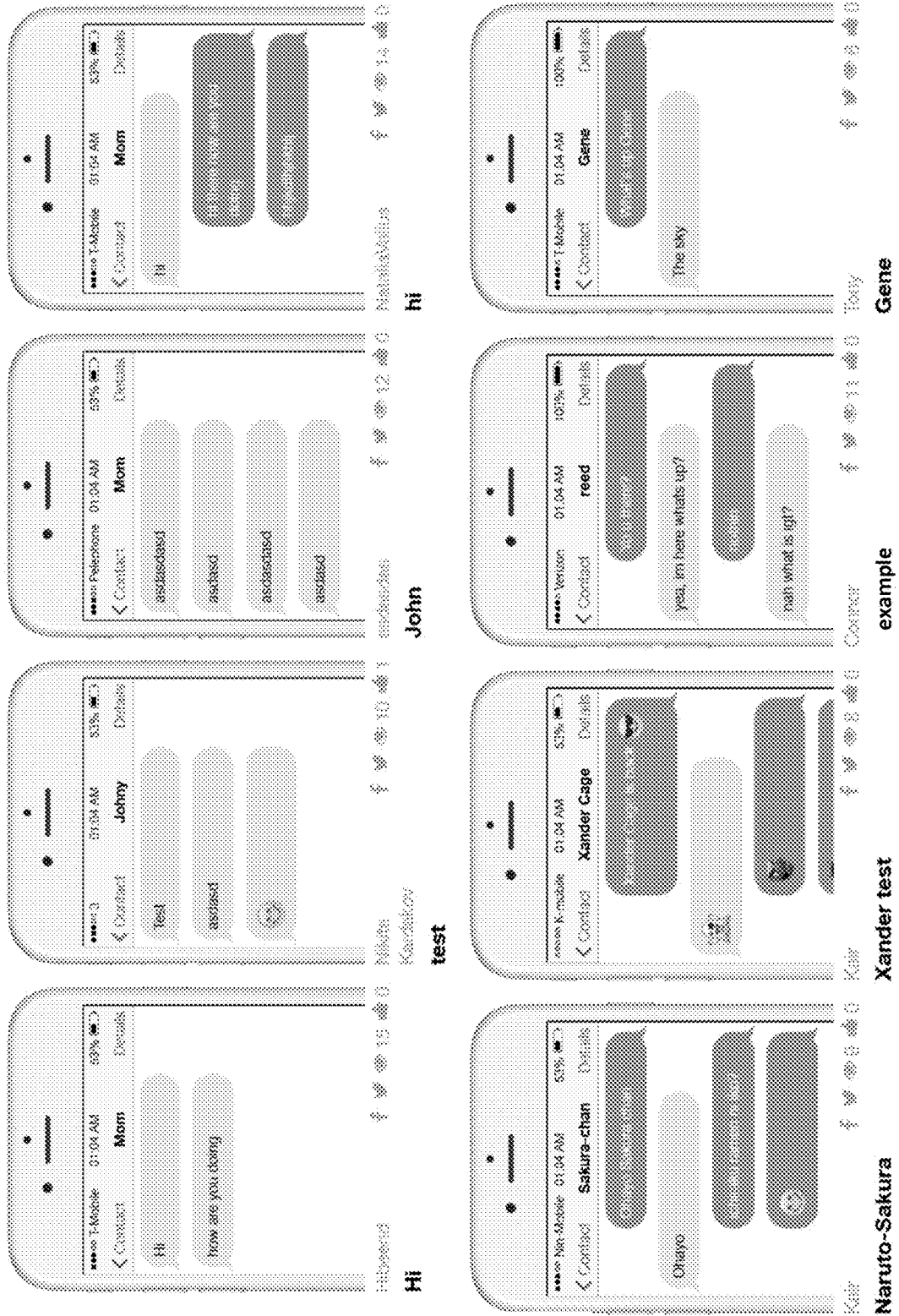
Figure 10:
Figure 11:
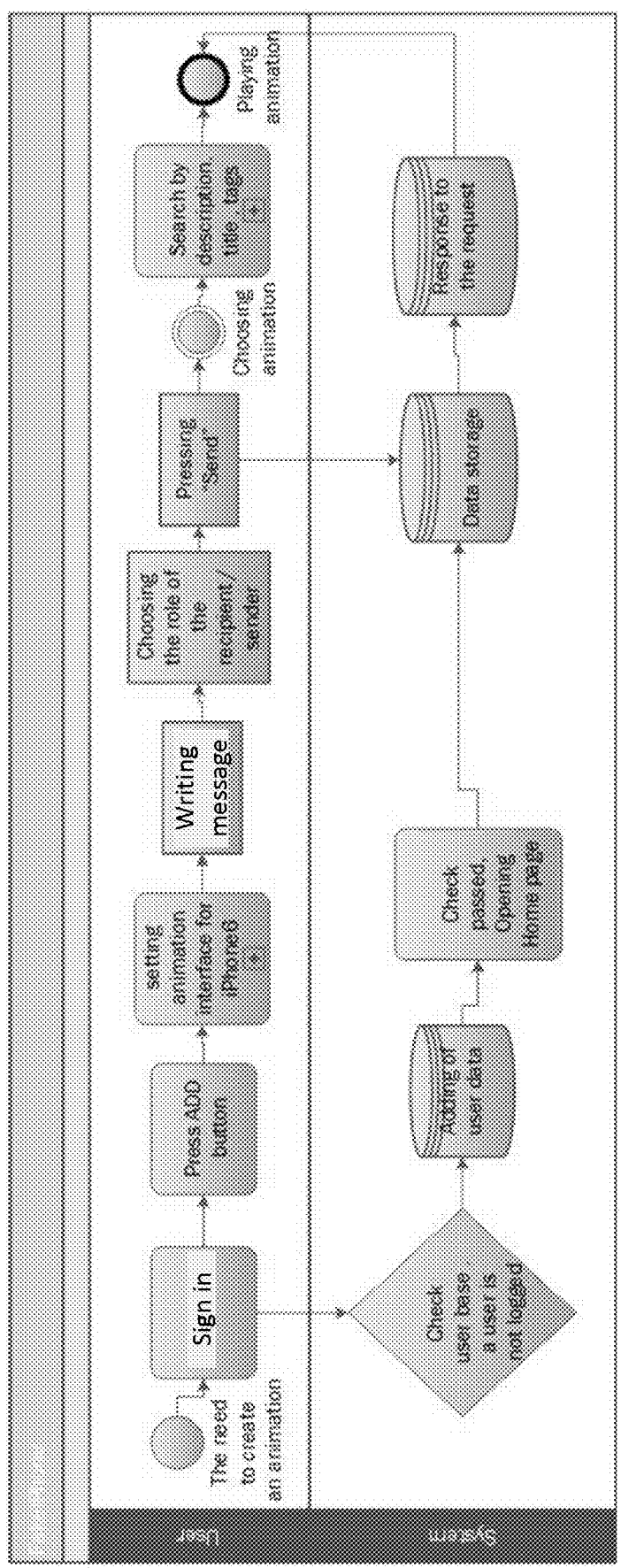
Figure 12:
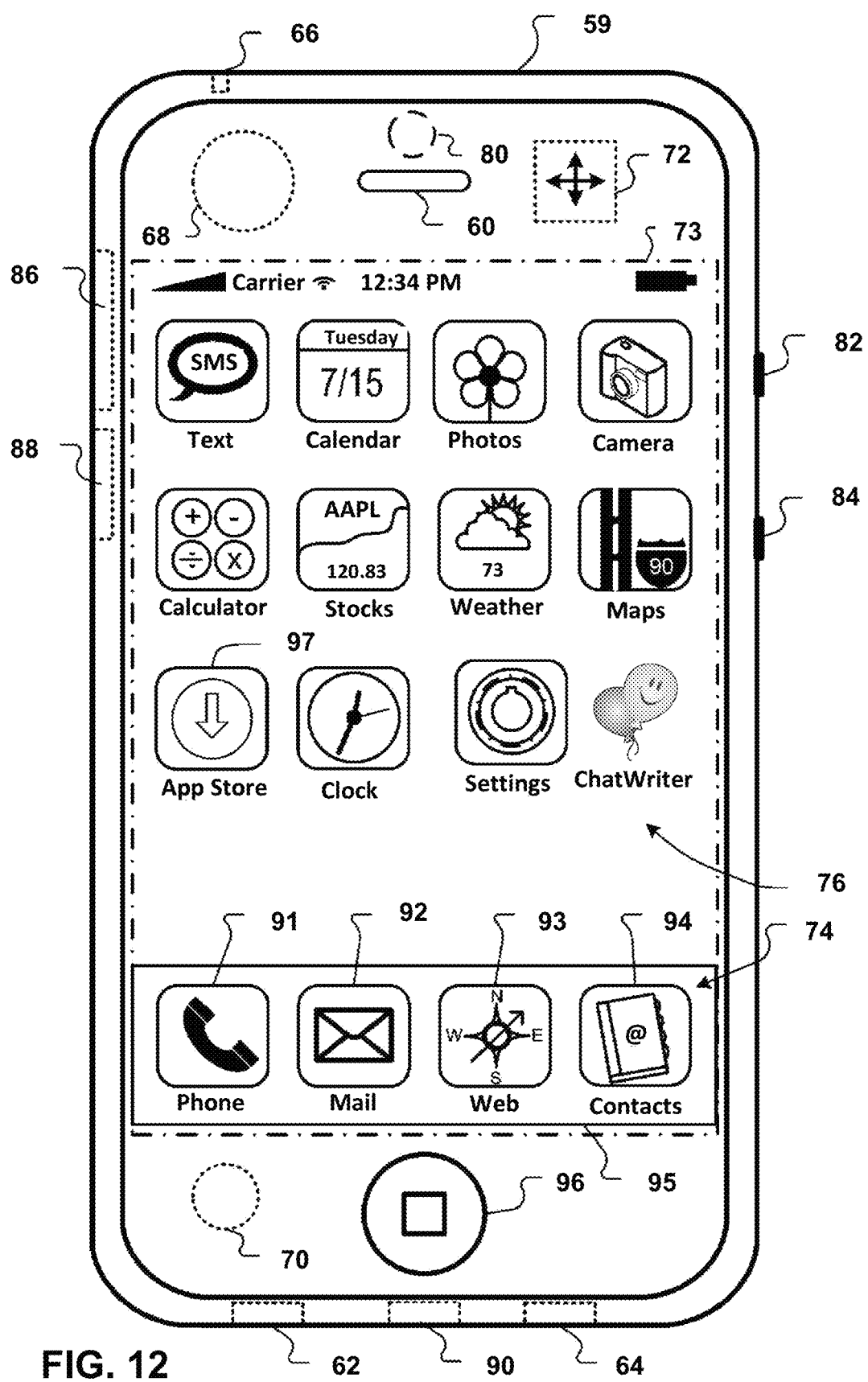
Figure 13:
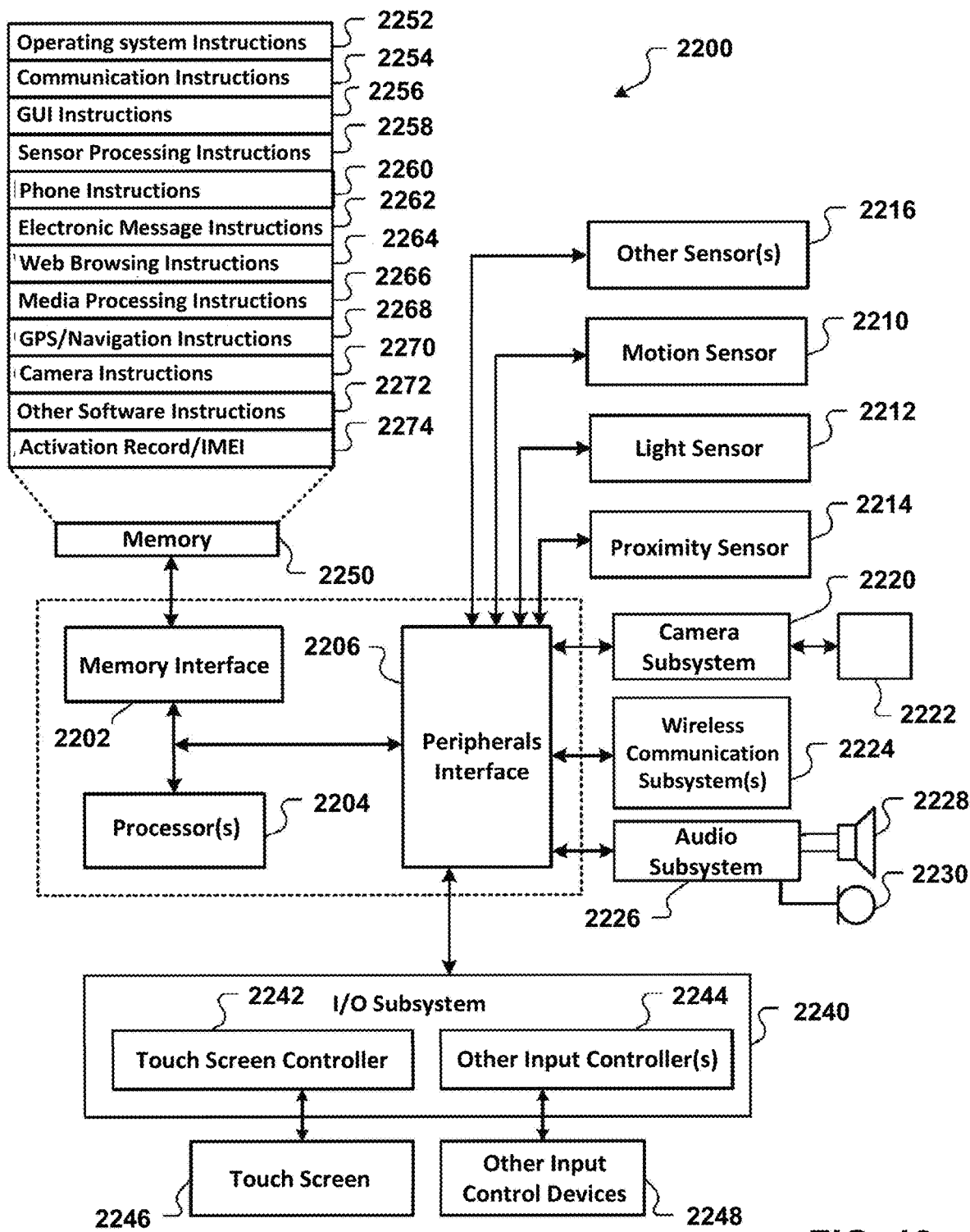

FIG. 7 illustrates an interface for creation of a chat, in accordance with the exemplary embodiment;

FIG. 8 illustrates how the chat data is saved, in accordance with the exemplary embodiment;

FIG. 9 illustrates that the created chats are saved on the main page of the chatwriter site and can be seen and read by other users;

FIG. 10 illustrates a common view of a saved chat as it is visible to the users, in accordance with the exemplary embodiment;

FIG. 11 illustrates a system block diagram, in accordance with the exemplary embodiment;

FIG. 12 is a block diagram of an exemplary computing device that can be used in the invention;

FIG. 13 is a block diagram of an exemplary implementation of the device.

DETAILED DESCRIPTION OF THE PREFERRED EMBODIMENTS

Reference will now be made in detail to the preferred embodiments of the present invention, examples of which are illustrated in the accompanying drawings.

The present invention is directed to a method for an automated chatwriter for imitation of chat applications and chat exchanges that occur on user electronic devices. According to an exemplary embodiment, a server-based chatwriter application is provided to create an imitation of a real chat displaying a person's emotions during the chatting process server and client scripts and programming languages. The user can interact through the website, e.g., http:chatwriter.com/, or though a client application that interfaces to the server application, such as on http:chatwriter.com/. The proposed chatwriter module can be used in the film and entertainment industry that can save time during filmmaking, in social activities, advertising and any other processes that requires a process of storytelling via text messaging.

According to the exemplary embodiment, the process is implemented as follows.

1. A user enters a text message into the input field of the chatwriter interface, changes the roles of a conversation partner by switching a message color. The system creates a database where all symbols entered by users are saved on the server.

2. User saves the chat and system places the entered symbols and key values of typing into the database.

3. User plays the chat back.

The system forms an interactive dynamic chat by using HTML, CSS and JavaScript (for example) on the client side, retrieves the values from the database and outputs them sequentially with a certain interval to imitate a message typing. The message typing imitation is implemented by using a keyboard model, which simulates real-time keyboard typing, where the symbols are activated from the data model and are placed into a dialog window drawn in the chat window. The intervals between the messages can vary depending on the emotional state of the actors at the moment (and can be programmed through a user interface by the filmmaker when he logs in from his desktop, either using a browser application or a dedicated application).

The user is able to choose whether he wants the system to use its own algorithm to simulate the speed and intervals of the typing or to record his typing, keeping all intervals after each letter the same as they were typed.

The system is also able to record user removing/deleting the characters. This makes the imitated chat more real from user's perspective.

According to the exemplary embodiment, the chat creating process has two stages: customization of chat settings and creation of the text of the chat. Three setting types such as General, Header, Keyboard allow for changing the interface settings.

First, in "Header" settings, the user sets a standard static interface that is visible in the upper screen part in the "Message creation mode" of the phone. Then a user sets a virtual messenger and creates the chat name in the field "Title" in General settings, enters tags in the field "Tags" and description in the field "Description." (see FIG. 7). All info added in general settings is displayed in the chat library on the main page.

According to the exemplary embodiment, a new format is created to display the process of chat creation. It allows for exploring the inner world of a hero through his/her interaction with a virtual partner. This format allows for actually seeing the process of chat creation, reflects the speed of message typing, message deleting or changing. Different emotions, doubts and concerns of the chatters are displayed as well. The chatwriter concept is implemented by creating a chat and saving it a form of an animation. According to the exemplary embodiment, it is possible to display the process of messages typing, to change roles from a sender to a receiver, to change the speed (or intensity) of message typing, to adjust the intervals between messages, record the way user types and replays the exact typing process by means of different chatwriter application settings.

In other words, the output of the chatwriter is a fake chat generated by an application, which uses a user input and setting configurations. According to the exemplary embodiment, the user inputs general and advanced settings such as title, tags, description, contact name, mobile carrier, time, battery, signal quality, typing speed, interval, sound settings, keyboard settings. Then, the user inputs message texts, changes roles (two roles: receiver and sender) and saves the chat. The chat messages can also include images, emojis and video.

According to the exemplary embodiment, the chatwriter is developed based on the applications of a chat creation simulation, but the outstanding feature of this application is to create the typing animation, share it in social networks, embed into other websites, download in image and video format, or store it in a user personal profile and play the animation at any time.

Note that both a sender and receiver are animated. However, the user who creates a chat, typically, enters the text for both the recipient and the sender. The chat is imitated as close as possible to a real-time chat. When the video editors add chats/messages to the movie, they have to manually "Photoshop" it. The proposed chatwriter allows for imitating the chat, without precise work of a designer or an editor's adding the aftereffects or using Apple™ Motion, etc. Additionally, the proposed chatwriter creates a chat meme that is more realistic than usual image memes.

Chats are replaying in animated format using textual data, in comparison to other fake message generators, chatwriter is not using its video or image players to show the content. Instead, the chatwriter is playing content using textual data, which users can copy from chat (while playing or paused) and paste it to any document based on their needs.

According to the exemplary embodiment, the chatwriter is a client-server application. In the current implementation chatwriter is represented as a web based application, which contains HTML, javascript, PHP and/or CSS files. HTML page contains a message and save settings form. The save settings form contains general settings such as title, tags, description and advanced settings such as contact name, mobile carrier, time, battery, signal quality, typing speed, interval, sound settings, keyboard settings. The message form contains different symbols.

In one embodiment, the settings provides an ability for the user to upload images and convert them into chatwriter animated chat. The image must contain a chat, which is recognized by the chatwriter system and converted into text, which is then used to create chatwriter chat.

In one embodiment, the client side of the application sends a request into a chatwriter server when a user fills out the fields and saves the corresponding chat. The server confirms to the client that the data is saved. The server stores received client's data in a MySQL database. The client side of the application sends a request to chatwriter server to get the saved data from the DB.

The server provides a data array in JavaScript Object Notation (JSON) format and it is outputted on HTML page using JavaScript by applying Cascading Style Sheets (CSS), JQuery so that the chat chosen by the user can be displayed. The CSS is used for choosing colors, fonts, separate blocks layouts and other aspects that represent the common look of web pages in different styles or rendering methods. The CSS file contains only the list of the CSS rules and comments to them. The dynamic chat is produced from a data array (with settings and all messages with applied user parameters) using HTML, CSS, PHP, Jquery and JavaScript.

FIG. 7 illustrates creation of a chat, in accordance with the exemplary embodiment. User enters sender's Name in the field "Contact name," mobile operator and signal quality in the field "Carrier" on the chatwriter UI. It is possible to set time and battery power in the interface settings that are displayed in the upper screen part. Then, the user chooses whether or not to show the keyboard while previewing the interactive dynamic chat (check box "Show keyboard typing"), a typing speed ("Typing speed") on the correspondence dialog window in keyboard settings and interval between messages receiving ("Interval").

According to the exemplary embodiment, the user can create text messages and choose a role of a sender or a receiver. Then, the user selects type of the message: incoming or outgoing. Then the user enters the desired text on the keyboard in the message entry field and clicks the button "Send." Before sending, the user has an option to record his message the exact way he is typing if outgoing message is selected. The message is displayed on the screen in the message area. The user can change the text message, add new text or delete it by hovering the cursor directly over the message area using a laptop keyboard. After that, the user enters a new message using the laptop keyboard, clicks button "Send" and the next messages appears in the message area (the same way they would appear if a real mobile phone user were sending the text messages).

In the described embodiment, the user marks message area and uses edit option to choose the sender/receiver role by changing the message color. After that, the message moves on the other side of the screen (e.g., from left to right) and displays the role in the same way the real chat (e.g., an iPhone or an Android-based phone or a desktop or a tablet) does.

The chatwriter system imitates each letter and deletion typing for outgoing messages. The incoming message is received as a whole message at once like in a real chat, with only one user witnessing and experiencing the chat process.

FIG. 8 illustrates how the chat data is saved, in accordance with the exemplary embodiment. All data is saved by the system during chatting—i.e., the process of message typing or deleting is displayed on the keyboard where appropriate buttons and symbols are highlighted and typed in the input message field by clicking "Play" button. The interface of a "Send" button imitation, message area creating and answer obtaining is the same as on a computing device.

According to the exemplary embodiment, a user can search for chats on the http://***chatwriter.com/#/ page in the chat server library. While scrolling this page, the user can see the created chats with Titles, Tags and Description. Because all data is stored in a textual format, the user can search for the desired chat content among other chats by using a "Search" field. The detailed chat view is available after clicking on it. A "Play" button starts the process of creating the dynamic interactive chat.

According to the exemplary embodiment, images and text symbols are bound together to create an imitation of chats. As discussed above, the produced chat has nothing to do with the actual images or frames, it is produced from a data array (with settings and all messages created by application of user and system parameters) obtained from a database and delivered to the client in JSON format with the help of HTML, CSS, jQuery, JavaScript that make the chat appear dynamic.

According to the exemplary embodiment, the system allows for controlling the receiving messages' speed depending on a number of symbols. For example, longer sentences need more time to create realistic effects of animation, which shows the speed of typing messages, the keyboard and the user's typing process (for example, how the virtual keyboard responds to the virtual keys being tapped by briefly showing the tapped letter in a larger size, or other behavior of the virtual keyboard, such as changing they keyboard from letters to symbols), the pauses between words and/or characters, smileys (and similar graphical objects, including animated smileys) as they appear to the user both at time of creation of the message and at time of receipt of the message, depending on which side of the conversation is being imitated, deletion of characters and words, autocorrect of misspelled words or phrases, the process of deleting and receiving other messages in the "standard" messaging interface while typing. According to the exemplary embodiment, the website http://***chatwriter.com/#/ is used to create a fake chat on the web application page which looks like a computing device. Once the record (REC) function is activated, the user can enter the texts (as well as other objects, such as images, video, attachments, smileys, etc.). The interface can be used on multiple platforms, such as iOS™, Android, MS Windows, OS X for imitating variety of interfaces of the software on these platforms, such as Facebook chat, Viber chat, Whatsapp, Skype, Emo, Telegram, VK, etc. Different skins can be applied to chatwriter messaging system. Other functions are supported by the chatwriter website, including exporting to GIFs, jpeg or video.

According to one embodiment, emojis are used to display users' emotions. It is possible to change a sender by selecting the message color. In one embodiment, a library of favorite chats accelerates the process of searching through the chats. The chats library provides chat thumbnails. A detailed view appears when user hovers over a thumbnail. The user is also able to sort chats by categories, tags, authors, etc. Different themes or skins can be selected for Facebook™, Google™ hangout, Viber and other chats. The skin/theme selected for playback may be the same as the one used to record it, or a different one. Viewers are able to select the theme/skin they would like to show for the chats during playback.

Note that the chats that are created on chat writer are fake. They can have multiple skins (designs) that look like other real chats. However, unlike a conventional animation, no images or frames are involved in the chat animation. The chat animation is generated using scripts as discussed above.

According to the exemplary embodiment, a version of a chatwriter can be implemented for simulation of iOS or Android-based, desktop or web instant messaging systems. Steps of creating the animation are as follows:

1. Fill in all fields in settings chat name, chat description, chat tags. Chat settings include career, speed typing, interval between messages, recipient name, level of connection (see FIG. 7).

2. Write the text message. The user writes the messages for both the recipient and the sender;

3. New animation is saved to animations library after pressing "Save" button—see FIG. 8.

4. Animation with the process of typing message on the keyboard is available after pressing "Play" button (see FIG. 8 on the right).

FIG. 9 illustrates that the created chats are saved on the main page of the chat writer site and can be seen and read by everyone;

FIG. 10 illustrates a common view of a saved chat as it is visible to the users, in accordance with the exemplary embodiment. When a user wants to see a particular chat, he chooses it by the title from the list (FIG. 9), presses the "Play" button and views the animated chat.

FIG. 11 illustrates a system block diagram in accordance with the exemplary embodiment. Note that unlike a conventional animation with a set of pictures, the dynamic chat is generated using a data array in JSON format using HTML, CSS, jQuery, JavaScript.

According to the exemplary embodiment, the main page of the chat writer site contains a list of chats (categorized by tags). Each chat contains a thumbnail, name, views, author and likes. The chat creation phone screen includes a text input field, a send button and a recipient/sender switch.

In one embodiment, the following elements are implemented:
Emojis;
library of favorite chats;
chats sorting, categorization;
playback functionality;
themes for Facebook™, Google™ hangout and other chats;
typing recording (animation will show user typing, deleting and receiving other messages while typing).
importing images and converting their content into animated chats.

According to the exemplary embodiment, the website is meant to create and share animated meme out of people's daily habit—text messaging. A network of phone/chat conversations, where each conversation is animated and imitates a real chat, can be created. Many jokes currently tell the stories in a form of text messages and are represented by static image formats. The chatwriter server can bring more reality and possibility to see text messages typing, sending or waiting on answers. The chatwriter website is a sharing network, where users can have their own profiles, able to create and share messaging story with everyone. In one embodiment, the chat can include user images and/or videos inserted into the messages.

In a further embodiment, a viewer (not the one who generated the chat) can control the speed of typing, and vary it from the speed of the original recording. This may be letter/symbol specific, or it may be done by specifying a proportional increase of wait time between the letters In a further embodiment, a viewer can click on the dedicated button to show the next message in the chat thread (i.e., without waiting period or completion of typing).

In a further embodiment, chatwriter system can automatically upload the user's generated content to the remote services, such as to chatwriter's YouTube channel.

In a further embodiment, a viewer can select the skin to display for their chats, which may be different from the skin used to generate the chat.

In a further embodiment, the chat can be exported as a video file, gif, and jpeg files.

In a further embodiment, the chat interface that is imitated can be not just, but also desktop, mobile and web-based application's interface.

FIG. 12 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 13 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A server-implemented method for creating and sharing a fake chat animation among users, the method comprising:
    (a) at an animation server, receiving a user connection request containing authorization parameters;
    (b) authorizing a user and connecting a computer to the animation server;
    (c) acquiring fake chat parameters that include battery and signal quality of a user device into an animation application interface;
    (d) receiving a fake chat text written on behalf of a user and on behalf of a receiver, where the fake chat text written on the computer imitates messages that would be sent between the user and the receiver, including imitation of message timing, speed of typing and pauses between messages, and wherein same user writes both sides of the conversation on the computer, that includes switching message color;
    (e) saving the fake chat animation that represents the imitated messages on the animation server;
    (f) receiving a user selection of the fake chat animation via a chat thumbnail on the animation server;
    (g) providing the selected animation to the user device for playback; and
    (h) repeating steps (b)-(g) for a subsequent fake chat animation.

2. The method of claim 1, further comprising generating the fake chat animation by creating a data array in JSON format based on the fake chat parameters and by using any of HTML, CSS, jQuery and JavaScript.

3. The method of claim 1, wherein the fake chat text written on behalf of the user includes at least one image embedding into the fake chat text.

4. The method of claim 1, wherein the selected animation includes at least one video embedded into the fake chat text, and wherein the fake chat text includes a playback of the video.

5. The method of claim 1, wherein the selected animation includes animation effects simulating behavior of a virtual keyboard.

6. The method of claim 1, wherein the selected animation includes pauses between keystrokes that match the pauses between keystrokes when the user was entering the fake chat text on the computer.

7. The method of claim 1, wherein the selected animation includes deletion of keystrokes that match the deletions when the user was entering the fake chat text on the computer.

8. The method of claim 1, wherein the selected animation includes simulated notifications of messages received from other users.

9. The method of claim 1, wherein the fake chat parameters include career, speed typing, interval between messages, recipient name, and level of connection.

10. The method of claim 1, wherein the fake chat parameters include whether the user is a receiver or a sender.

11. The method of claim 1, wherein the fake chat animation includes autocorrect of misspelled words.

12. The method of claim 1, wherein the fake chat animation includes emojis.

13. The method of claim 1, wherein a library of favorite fake chats, including fake chat thumbnails, is displayed to the user for selection.

14. The method of claim 1, wherein a selection of chat skins is available to the user for changing an interface appearance of the fake chat animation.

15. The method of claim 1, wherein a chat skin selected for later display of the chat animation is different from the chat skin used to create the fake chat animation.

16. The method of claim 1, further comprising converting an image into the animated chat based textual data contained in the image.

17. A system for creating and sharing a fake chat animation among users, the system comprising:
   (a) means for receiving a user connection request at an animation server containing authorization parameters;
   (b) means for authorizing a user and connecting a computer to the animation server;
   (c) means for acquiring fake chat parameters that include battery and signal quality of a user device into an animation application interface;
   (d) means for receiving a fake chat text written on behalf of a user and on behalf of a receiver, where the fake chat text written on the computer imitates messages that would be sent between the user and the receiver, including imitation of message timing, speed of typing and pauses between messages, and wherein same user writes both sides of the conversation on the computer, that includes switching message color;
   (e) means for saving the fake chat animation that represents the imitated messages on the animation server;
   (f) means for receiving a user selection of the fake chat animation via a chat thumbnail on the animation server;
   (g) means for providing the selected animation to the user device for playback; and
   (h) means for repeating steps (b)-(g) for a subsequent fake chat animation.

18. A computer program product comprising a non-transitory computer readable media containing computer code for creating and sharing a fake chat animation among users, the code performing the functions of:
   (a) at an animation server, receiving a user connection request containing authorization parameters;
   (b) authorizing a user and connecting a computer to the animation server;
   (c) acquiring fake chat parameters that include battery and signal quality of a user device into an animation application interface;
   (d) receiving a fake chat text written on behalf of a user and on behalf of a receiver, where the fake chat text written on the computer imitates messages that would be sent between the user and the receiver, including imitation of message timing, speed of typing and pauses between messages, and wherein same user writes both sides of the conversation on the computer, that includes switching message color;
   (e) saving the fake chat animation that represents the imitated messages on the animation server;
   (f) receiving a user selection of the fake chat animation via a chat thumbnail on the animation server;
   (g) providing the selected animation to the user device for playback; and
   (h) repeating steps (b)-(g) for a subsequent fake chat animation.

* * * * *